April 29, 1958 T. H. GORDON 2,832,794
HYDROLYSIS OF ORGANOSILANES
Filed Nov. 5, 1952 2 Sheets-Sheet 1
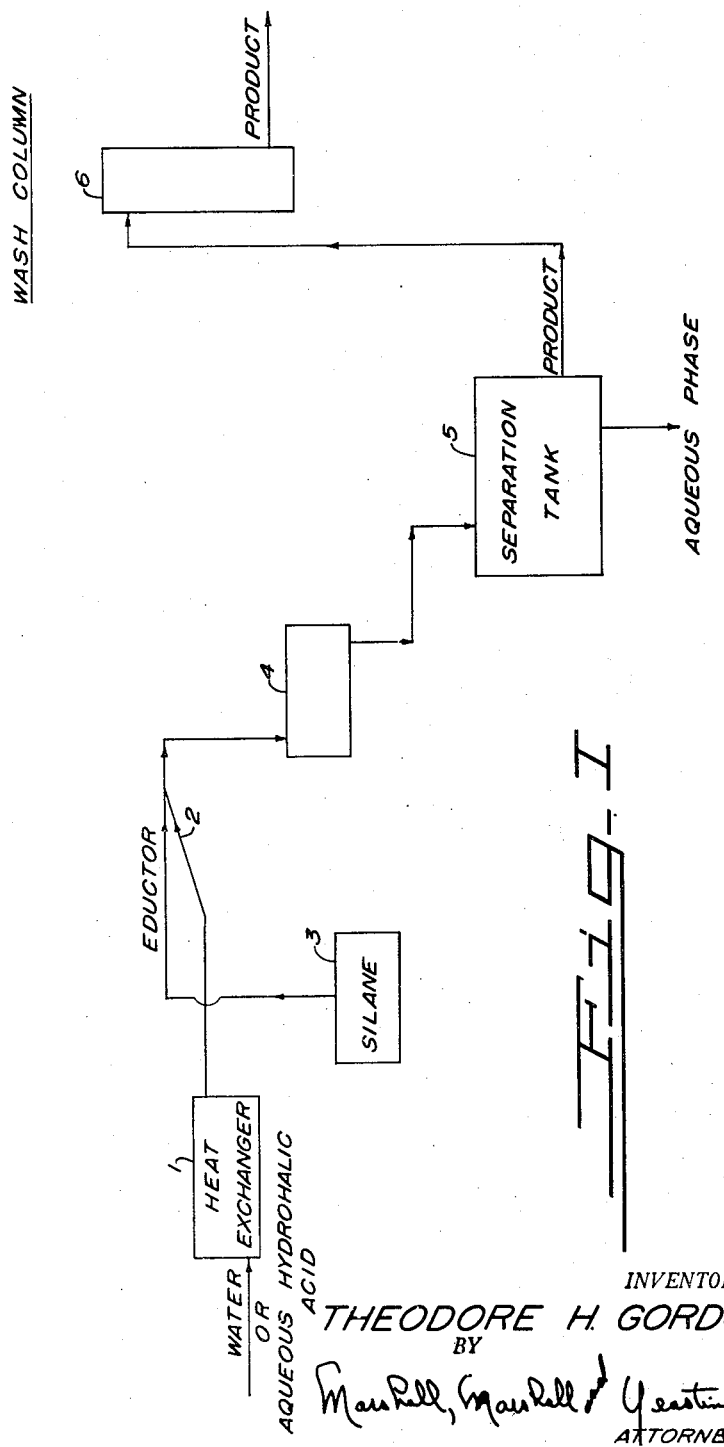
INVENTOR.
THEODORE H. GORDON
BY
ATTORNEYS

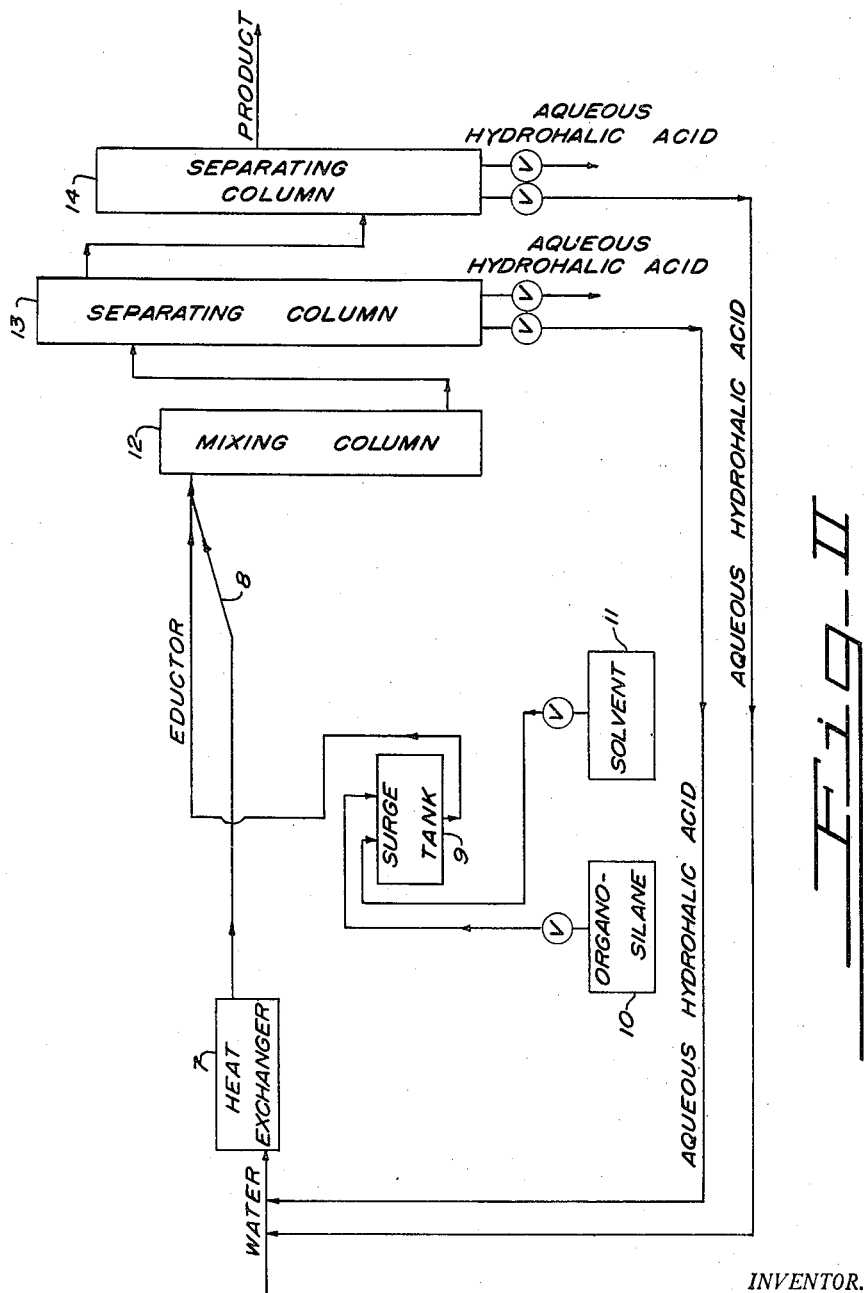
Fig. II

United States Patent Office 2,832,794
Patented Apr. 29, 1958

2,832,794

HYDROLYSIS OF ORGANOSILANES

Theodore H. Gordon, Toledo, Ohio, assignor, by mesne assignments, to Allied Chemical & Dye Corporation, New York, N. Y., a corporation of New York Application November 5, 1952, Serial No. 318,924

11 Claims. (Cl. 260—448.2)

The invention relates to an improved method of hydrolyzing organosilanes.

The methods heretofore used in commercial practice for the hydrolysis of organosilanes have the disadvantage that they cause rapid condensation of the organosilanols formed by hydrolysis of the organosilanes, so that the products obtained by such methods are highly condensed organosiloxanes rather than monomeric or slightly condensed organosilanes. The highly condensed organosiloxanes produced by such methods are relatively inert substances of high molecular weight that are not sufficiently reactive for use as intermediates in the production of silicone-modified products such as silicone-alkyd resins. Such highly condensed organosiloxanes also have only limited solubility in some of the common solvents and often require the use of expensive solvents.

The principal object of the invention is to provide a novel method of hydrolyzing organosilanes which produces monomeric or slightly condensed silanols of low molecular weight that are very reactive and therefore useful as intermediates in the production of many silicone-modified products.

Another object of the invention is to provide an efficient continuous process for the hydrolysis of organosilanes in liquid phase.

More specific objects and advantages are apparent from the following description and the accompanying drawings, which illustrate and disclose but are not intended to limit the scope of the invention.

United States Patent No. 2,483,963 describes the state of the art with respect to the hydrolysis of organosilanes as follows:

"Heretofore, the usual method of hydrolyzing organosilanes with water has been by batch processing in liquid phase. The resulting water-in-soluble organosiloxane is then separated from aqueous hydrochloric acid. The use of various types of solvents in the hydrolysis of organochlorosilanes has been described in the art. A characteristic feature of these processes is that the hydrochloric acid produced is of only slight value due to being quite dilute. If the proportion of water is reduced to avoid dilution, the percentage of unhydrolyzed chlorine is increased. It might be possible to adapt this batch method of hydrolysis to continuous production of organosiloxanes, but even if this were done, hydrolysis of the organochlorosilane would still be incomplete and the hydrochloric acid dilute."

The present invention is based upon the discovery of a continuous process of hydrolyzing organosilanes in liquid phase which not only produces complete hydrolysis and can be operated to increase the concentration of a by-product such as hydrochloric acid, but also yields hydrolysis products of improved stability, reactivity and solubility. The present method of hydrolyzing organosilanes comprises the steps of merging a continuous aqueous liquid stream with a continuous anhydrous liquid stream comprising the organosilane, to form a liquid reaction stream, continuously conducting the reaction stream away from the point of merger to keep the final products of the reaction out of contact with the initial products of the reaction and out of contact with the reactants, and maintaining the flow of the reaction stream until the reaction is substantially complete.

It has been discovered that the present method yields hydrolysis products of low molecular weight by reason of the fact that the reaction stream is continuously conducted away from the point at which the aqueous stream merges with the anhydrous stream containing the organosilane. In the present method the hydrolysis of the organosilane molecules takes place in a uniform manner so that by the time their hydrolysis is complete, the resulting highly reactive silanol molecules are at a point where they do not come into contact with fresh organosilane. It has been found that such contact is undesirable because the silanol tends to react with the organosilane to produce large cross-linked organosiloxane molecules.

The methods of hydrolysis heretofore used in commercial practice have been suitable only for the hydrolysis of halosilanes, or halosilane mixtures, having less than three halo groups per silicon atom, and have been designed to produce completely condensed siloxanols without controlling or arresting the condensation. Such methods have not been satisfactory for use with organotrihalosilanes, whose hydrolysis is more difficult to control. The present method, however, provides excellent control of condensation even when used for the hydrolysis of organotrihalosilanes.

Figure I of the accompanying drawings is a flow sheet illustrating process units and their relationship in carrying out the present method.

Figure II is a flow sheet illustrating a modification of the process units shown in Figure I and their relationship in carrying out a preferred species of the present method.

The process may be carried out (Figure I) by introducing a hydrolyzing medium consisting of either water or aqueous hydrohalic acid into the coils of a heat exchanger 1 under a pressure of 10–30 p. s. i. The heat exchanger 1 is cooled by circulating a temperature changing medium in a two-liter jacket surrounding coils, consisting of five turns of one-quarter inch copper or glass tubing (depending upon whether water or acid is used). The temperature changing medium can be any material (as for example salt water or a glycol-water solution, refrigerated by Dry Ice) which will chill the water or aqueous acid to a point low enough so that the flow of the hydrolyzing medium and the organosilane can be controlled to keep the reaction temperature below 20° C. during the subsequent liquid phase hydrolysis of the organosilane.

The flow of the aqueous stream passing through a one-eighth inch Pyrex eductor 2 draws a metered stream of a liquid organosilane (preferably dissolved in a solvent) from a container 3 into the system. The maximum permissible weight ratio of the organosilane stream to the aqueous stream varies with the temperature of the aqueous stream, since the colder the aqueous stream, the higher the proportion of organosilane that can be used without exceeding the maximum allowable temperature of 20° C. The weight ratio of the organosilane stream to the aqueous stream may be from 1:5 to 1:50. Preferably the ratio is from 1:25 to 1:30. The reaction temperature preferably is between 0° and 20° C., although the temperature can be lower. As soon as the organosilane contacts the aqueous stream a very rapid reaction begins, and the reaction continues as the reaction stream flows into a mixing chamber 4. The mixing chamber 4 either can be an agitated chamber, or can be a column (2½ feet long by ¾ inch in diameter) packed with ³⁄₁₆ inch glass helices. In either case the hydrolysis reaction is completed away from the point where the fresh organosilane is entering the system.

The completion of the hydrolysis reaction safely away away from contact with the fresh organosilane is a novel feature which produces a valuable low molecular weight product and which distinguishes the instant process from prior hydrolyzing processes. The prior batch processes necessarily permitted reaction of organosilane molecules with organosilanol molecules, and no continuous process has heretofore solved this problem. The hereinbefore mentioned United States Patent No. 2,483,963 relates to a continuous organosilane hydrolyzing process wherein the reaction is conducted in a gas and liquid contact zone to "effect hydrolysis of said silane with the condensation of hydrolysis product thereof to siloxane." Such a gas and liquid contact zone necessarily involves a channeling action and allows the liquid organosilane dripping down from the top of the column to contact both the water vapor and the newly formed organosilanol, to produce large cross-linked organosiloxane molecules whose formation does not occur in the present process.

The products of the reaction are allowed to separate in a tank 5, and the organosilanol product is drawn off to a wash column (28.5 inches high by 3 inches in diameter, having a packed middle section 10 inches high) wherein the organosilanol product is washed with a stream of water.

The product may be dried, preferably by azeotropic distillation of the water along with a portion of the solvent. The product also may be dried over such a drying agent as anhydrous calcium chloride or anhydrous sodium sulfate. Such a drying agent is then removed (e. g., by filtration) from the dried product.

The products of the present process are more uniform than the products of other hydrolysis processes, such as batch processes, since in the instant process the organosilane and the hydrolyzing medium are allowed to mix completely and constantly in only small quantities so that the reaction goes all the way to completion (away from the entering fresh organosilane) to produce an only slightly condensed product.

When the organosilane used is a halosilane, the process which has been described produces, as a by-product, a dilute hydrohalic acid which is of only slight value. A way of producing a more concentrated acid, as a valuable by-product, is to recycle the aqueous phase produced by the hydrolysis reaction, along with sufficient make-up water to equal the amount of water used up in the hydrolysis reaction, to form the entering aqueous stream, until the acid concentration builds up to the desired strength. Once the acid concentration has been built up, a fixed proportion of the aqueous phase can be constantly withdrawn from the system and the rest of the aqueous phase recycled, along with sufficient make-up water to equal the amount of water withdrawn from the system plus the amount of water used up in the hydrolysis reaction. This fixes the operating conditions of the process and yields a by-product acid solution of constant strength.

An additional advantage secured by recycling the cold acid layer is a definite lessening of the refrigeration load. The refrigeration load in processes heretofore known, such as batch processes, has been extremely large, since not only is the aqueous phase not recycled in such processes, but the total time of hydrolysis in batch processes has to be short to provide an economical time cycle, and this increases the refrigeration load in batch processes.

United States Patent No. 2,483,963 states that: "One of the difficulties encountered in liquid phase hydrolysis of organochlorosilanes is the overheating of the silicon compounds due to the hydrolysis reaction being exothermic. For this reason, it has been a common method in the hydrolyzing of organochlorosilanes to pour the silane or a solution of the silane in an organic solvent onto crushed ice or to employ a large excess of water. Overheating frequently results in the cleavage of organic radicals from the silane." The instant liquid phase process operates without the overheating described in the foregoing quotation.

Modified process units for carrying out the method of the invention are illustrated in Figure II. This modification also eliminates the necessity for any washing operation by providing two separating columns in place of the single separation tank described in connection with Figure I. The process carried out by the use of this modified apparatus is the preferred species of the present process.

In carrying out the process by use of the units illustrated in Figure II, water, as a hydrolyzing medium, is run into a Saran pipe leading to a heat exchanger 7 at the rate of about 1,500 pounds per hour at the start-up. The hydrolyzing medium is carried throughout the system in Saran pipes which are resistant to the hydrohalic acid. The heat exchanger 7 (24–1¼ inch x 9 feet tubes— single pass—10 inch steel shell—50 p. s. i. tubes and shell) operates in connection with a refrigeration unit (7½ H. P., self contained, solution out 30° F., solution in 50° F., normal load 60,000 B. t. u. 1 hr.).

The flow of the hydrolyzing medium passing through a mixing eductor 8 (Schutte-Koerting—½ inch, with flanged ends) draws a metered amount of a liquid organohalosilane (preferably dissolved in a solvent) from a surge tank 9 into the system. The surge tank can be used for mixing an organohalosilane (stored in a tank 10) and a solvent (stored in a tank 11). The ratio of the amount of the organohalosilane to the amount of the hydrolyzing medium, and all other reaction conditions, are the same as those hereinbefore mentioned in connection with Figure I. As soon as the organohalosilane contacts the hydrolyzing medium at the mixing eductor, a very rapid reaction begins, and the reaction continues as the reaction mixture flows into a mixing column 12 (Pyrex—4 inches in diameter by 8 feet long—ASME flange on each end—packed with ¾ inch rings) wherein the hydrolysis reaction goes to completion.

The products of the reaction are allowed to separate in a separating column 13, and the organosilanol product is drawn off to a second smaller separating column 14. The use of the second column gives such a pure organosilanol product that no washing step is needed. The dilute hydrohalic acid produced after the start-up of the process preferably is recycled. This is continued until the acid concentration builds up to the desired strength, after which a fixed proportion of the aqueous phase can be removed as a valuable by-product, as hereinbefore described. The amount of the aqueous phase to be removed can be determined by calculating the rate of formation of hydrohalic acid from the rate at which the organohalosilane enters the system, and then regulating the rate of withdrawal of hydrohalic acid so that it equals the rate of formation of the acid. Also, the rate at which make-up water should be supplied can be calculated by adding the rate at which water is withdrawn in the by-product to the rate at which water is consumed by hydrolysis of the organohalosilane.

In some cases it may be desirable to apply refrigeration to a portion of the system other than the entering aqueous stream—for example to the mixing column 12.

The advantages of this method over processes heretofore known, such as batch processes, are numerous. In addition to the advantages hereinbefore mentioned other advantages are:

(1) Shortening of the time cycle for hydrolysis,
(2) Better control of the mixing of the reactants, and
(3) Better control of temperature.

Hydrolysis of chlorosilanes by the present method takes only a few seconds, whereas 15 to 30 minutes are required for the hydrolysis step in batch methods of hydrolyzing chlorosilanes.

HYDROLYZABLE ORGANOSILANE

A hydrolyzable organosilane (one or a mixture of which is used in the method of the present invention) may be any substance whole molecule consists of a silicon atom to which are attached four monovalent groups, at least one of which is an organic group attached by a

linkage, such as an aliphatic group, aryl group, or aralkyl group, from one to three of which are hydrolyzable groups and not more than two of which are hydrogen.

"Aliphatic group" as used herein means a straight, branched, or closed chain aliphatic hydrocarbon group. A straight or branched chain monovalent aliphatic group attached to a silicon atom may be a primary, secondary or tertiary alkyl or alkenyl group having from one to twelve carbon atoms. A closed chain monovalent aliphatic group attached to a silicon atom may be cyclopentyl or cyclohexyl, or a mono-, di- or tri-alkyl-substituted cyclopentyl or cyclohexyl group, each alkyl substituent being a primary, secondary or tertiary alkyl group having from one to six carbon atoms, the total number of carbon atoms in the alkyl substituents being not more than six.

"Aryl group" as used herein means a group having from six to twelve carbon atoms and consisting of from one to two benzene nuclei (e. g., a phenyl, naphthyl or diphenyl group), having no substituents or having from one to five nuclear substituents each of which is a halogen atom of atomic weight less than 80, or is an alkyl or alkenyl group containing not more than 6 carbon atoms.

"Aralkyl group" as used herein means a group having from seven to twelve carbon atoms, consisting of any aliphatic group hereinbefore described, in which one hydrogen atom has been replaced by an aryl group hereinbefore described.

"Hydrolyzable group" is used herein to mean a halo, alkoxy, amino, aroxy, or acyloxy group. The halo group may be any one having an atomic weight less than 80. The alkoxy groups may be any primary or secondary alkoxy group having from one to four carbon atoms. The aroxy group may be any in which the aryl group is as hereinbefore described. The acyloxy group may have the general formula

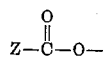

in which Z is an aliphatic, aryl or alkaryl group as hereinbefore described.

It is preferred that an alkenyl group attached to a silicon atom in a hydrolyzable organosilane be an alpha-beta-unsaturated group such as a vinyl group. Beta-gamma-unsaturated groups in alkenylsilanes, particularly methallyl groups in methallylsilanes, tend to be highly unstable during hydrolysis of such silanes. Thus, beta-gamma-unsaturated groups, like beta-halo-substituted alkyl or aralkyl groups, may be considered to be hydrolyzable groups in the practice of the invention, since such groups are removed from silane starting materials during hydrolysis.

Examples of hydrolyzable organosilanes that can be used in the method of the invention include methyltrifluoro- or chloro- or bromo-, dimethyldifluoro- or chloro- or bromo-, trimethylchloro-, ethyltrifluoro- or chloro-, diethyl- dichloro-, propyltrifluoro- or chloro-, dipropyldichloro-, isopropyltrifluoro-, butyltrifluoro- or chloro, dibutyldifluoro-, isobutyltrichloro-, secondary butyltrichloro-, pentyltrifluor- or chloro-, dipentyldifluoro-, 2-methylpentyltrichloro-, 3-(2,2,4-trimethylpentyl)trichloro-, diethyldiethoxy-, ethyltrimethoxy- or ethoxy- or propoxy- or butoxy- or isopropoxy-, diethylethoxy- chloro-, ethyldiethoxychloro-, propylchlorodifluoro-, propylfluorodichloro-, isopropylchlorodifluoro-, isopropylfluoro-, dichloro-, butylchlorodifluoro-, butylfluorodichloro-, isopentyltrichloro-, ethylmethyldichloro-, propylmethyldichloro-, monohydrophenyldichloro-, monohydroethyldichloro-, propyltriethoxy-, isopropyltriethoxy-, butyltriethoxy-, isobutylmethoxyethoxychloro-, isopentyltriethoxy-, ethyldiethoxyacetoxy-, phenyltrifluoro- or ethoxy- or propoxy- or isobutoxy-, diphenyldifluoro- or chloro- or bromo- or ethoxy- or phenoxy- ethylphenyldichlorobenzylethyldichloro-, diphenylphenoxychloro-, phenylbenzyldiethoxy-, benzyltriethoxy-, (2,4-dimethylphenyl) triethoxy-, alpha-naphthyltriethoxy-, betanaphthyltriethoxy-, cyclohexyltrichloro-, trimethylcyclohexyltrichloro-, p-tertiaryamylcyclohexyltrichloro-, butyltributoxy-, cyclohexyltributoxy-, secondary butyltributoxy-, alpha(trichlorophenyl) ethyltrichloro-, beta-(trichlorophenyl)ethyltrichloro-, gamma-tolylpropyltrichloro-, gamma-tolylbutyltrichloro-, beta-phenylethyltrichloro-, beta-tolylbutyltrichloro-, beta-tolylpropyltrichloro-, beta-phenylpropyltrichloro-, beta-(chlorophenyl)ethyltrichloro-, alpha-tolylethyltrichloro-, beta-tolylisobutyltrichloro-silanes, vinyltrichlorosilane, vinyltriethoxysilane, vinylphenyltrichlorosilane, vinylphenyltriethoxysilane, and the like.

The preferred organosilanes for use in the present method are organotrichlorosilanes, including phenyltrichlorosilane, and alkyltrichlorosilanes such as ethyltrichlorosilane.

In some cases it may be desired to cohydrolyze one or more organosilanes with a tetrafunctional substance such as a silicon tetrahalide, e. g. silicon tetrachloride, or an alkyl (e. g. ethyl) orthosilicate. Such cohydrolysis can be carried out by the present method if the tetrafunctional substance does not constitute more than 20 mol percent of the silanes to be hydrolyzed.

SOLVENTS

Solvents in which the organosilanes may be dissolved before entering the system include all solvents that are "inert" in that they do not undergo any chemical reaction that would interfere with the production of the desired hydrolysis products. Such solvents should be capable of dissolving the organosilicon hydrolysis products as well as the silanes.

Suitable solvents include ethers such as diethyl, ethylpropyl, dipropyl and propylbutyl ethers, and cyclic ethers such as dioxane; hydrocarbon solvents such as benzene, toluene, xylenes, hexanes, heptanes, and octanes; ketones such as acetone, methylethylketone and diethylketone; and alcohols such as methyl alcohol, ethyl alcohol, propyl alcohols and butyl alcohols. However, the preferred solvent is an organic solvent that forms a two-phase system with the water used for hydrolysis, which organic solvent has a molecular structure containing from one to two oxygen atoms which are connected only to carbon atoms and at least one of which is contained in a carbonyl radical connected to two polyvalent atoms of the class consisting of carbon and oxygen atoms, said oxygen atoms if more than one in number being contained in an ester linkage. Such a solvent may be an aliphatic monocarboxylic acid ester or aliphatic ketone.

A solvent that is used in the hydrolysis of silanes should not be substantially soluble in water, in order to avoid great losses of the solvent solution of the silane hydrolysis products. Thus, the phrase "forms a two-phase system with the water used for hydrolysis" is used herein to mean that the solvent is substantially immiscible with water in the proportions employed, i. e., that not more than approximately 5 percent and preferably considerably less than 5 percent of the solvent dissolves in the water used for hydrolysis.

Preferably the solvent has a boiling point below 200° C. (at atmospheric pressure) so that it can be readily removed from the final product and replaced with a less expensive solvent, if desired. The term "percent" or "parts" as used herein means percent or parts by weight, unless otherwise specified.

The preferred solvents include that class of ketones whose molecules have at least five and preferably not more than ten carbon atoms, e. g., methyl propyl ketone, methyl isopropyl ketone, methyl butyl ketone, methyl isobutyl ketone, methyl amyl ketone, dipropyl ketone, diisopropyl ketone, ethyl propyl ketone, ethyl isopropyl ketone, ethyl butyl ketone and ethyl isobutyl ketone. The preferred ketone solvents are methyl isobutyl ketone and methyl amyl ketone.

The preferred solvents also include that class of esters which may be considered to be derived by esterification of an aliphatic monohydric alcohol having from 2 to 8 carbon atoms with a saturated aliphatic monocarboxylic containing from 2 to 4 carbon atoms, the total number of carbon atoms in the ester molecule being at least five and not greater than 10. Non-reactive substituents, such as halogen atoms having as atomic weight less than 80, may be present in an aliphatic radical in either the acid or the alcohol.

Such aliphatic monocarboxylic acid esters include: n-propyl acetate, isopropyl acetate, n-butyl acetate, isobutyl acetate, secondary butyl acetate, tertiary butyl acetate, n-amyl acetate, isoamyl acetate, secondary amyl acetates, tertiary amyl acetate, n-hexyl acetate, isohexyl acetate, n-heptyl acetate, 2-ethylhexyl acetate, capryl acetate, ethyl propionate, isopropyl propionate, n-butyl propionate, secondary butyl propionate, isobutyl propionate, n-amyl propionate, isoamyl propionate, ethyl butyrate, n-propyl butyrate, n-butyl butyrate, isobutyl butyrate, n-amyl butyrate, isoamyl butyrate, isobutyl isobutyrate and isoamyl isobutyrate.

The most desirable organic solvents are isopropyl acetate and n-butyl acetate.

When the preferred solvents are diluted with other solvents such as xylene, it is desirable that at least one-fourth and preferably one-third of the solvent mixture consist of a solvent or solvents of the preferred type.

It is usually desirable to use a substantial amount of a solvent or solvents (e. g., from about 100 to about 300 ml. of solvents per gram mol of silanes). In some instances (e. g., when the silanes are hydrolyzable only with comparative difficulty) it is desirable to use considerably less sovent, while in still other instances (e. g., when the silanes are particularly easy to hydrolyze) it is desirable to use somewhat more solvent.

With highly volatile solvents such as diethyl ether it may be necessary to use a positive pressure pump rather than an eductor.

AQUEOUS STREAM

The composition of the aqueous stream entering the system in the present method may be different for different organosilanes. For the hydrolysis of halosilanes, the entering aqueous stream may consist of water alone. For the hydrolysis of amino, acyloxy or aroxysilanes, which are more difficult to hydrolyze, the entering aqueous stream should consist of a dilute solution of a mineral acid such as hydrochloric, sulfuric or phosphoric acid. Alkoxy groups are still more difficult to hydrolyze, and require the use of higher temperatures, greater concentrations of mineral acids and reduced amounts of solvents, to accelerate the hydrolysis reaction.

In order to produce complete hydrolysis, it is desirable to use an aqueous stream containing at least 5 and preferably 10 gram mols of water for every two gram atoms of hydrolyzable groups in the silanes entering the system, i. e., 5 to 10 times the amount of water theoretically required to hydrolyze the silanes.

PROPERTIES OF PRODUCT

The present method has been found to yield a product (siloxanol) having an average molecular weight below 4,500 and an acid number above 5, which is highly reactive and is readily soluble in common organic solvents. By conducting the present method under the preferred conditions herein described it is possible to obtain products having an average molecular weight below 3,000 or even between 500 and 1,500, and having an acid number of 10 to 50 or more. These results ar expedited by the use of butyl acetate or a mixture of butyl acetate and xylene as the solvent.

The "average molecular weight" of a siloxanol, as used herein, means the molecular weight determined by the elevation of the boiling point of benzene, using a Menzies-Wright molecular weight apparatus, with a differential type water thermometer, calibrated against benzil. (Molecular weights above 2,000 determined in this manner are approximate.)

The "acid number" of a siloxanol, as used herein, means the number of milligrams of potassium hydroxide (in alcohol solution) required per gram of siloxanol (on a completely condensed basis) to neutralize a xylene solution of the siloxanol in a rapid titration to the first permanent pink end point with phenolphthalein. (Because of the use of an organic solvent, such an acid number gives an indication rather than an absolute determination of acidity.)

The weight of siloxanol (on a completely condensed basis) in a solution can be determined by pouring a sample of the solution on a glass plate and baking the plate until the film is completely cured. The weight of the completely cured film is then the weight, on a completely condensed basis, of the siloxanol in the sample of the solution.

Example 1

Phenyltrichlorosilane (250 grams) and ethyltrichlorosilane (250 grams) are mixed with an organic solvent (500 cc. of butyl acetate) and placed in a container (see Figure I). The organosilane solution is continuously drawn, as a stream, into an agitated chamber by the action of a stream of water passing through an eductor, at a ratio of 1 part of organosilane solution to 50 parts of water, until the contents of the organosilane container is exhausted (over a period of 30 minutes). The water is pumped into the system under a pressure of 10 p. s. i., and is chilled by flowing through a heat exchanger before passing through the eductor, to give an inlet temperature (entering the eductor) of 3–10° C. and an outlet temperature (leaving the eductor) of 4–10° C. The contact of the silane-solvent solution with the chilled water produces an immediate hydrolysis reaction, which goes to completion in the agitated chamber at a temperature of 4–10° C. The aqueous phase (dilute hydrochloric acid) then is allowed to separate in a separation tank. The hydrochloric acid (55 pounds having an HCl concentration of 1.2 percent) flows from the bottom of the tank, and the phenylethylsiloxanol solution is drawn from the top of the tank to a washing column where it is washed with water. This product is tested by reacting it with a coconut oil-modified alkyd resin prepared by the following procedure: coconut oil (880 grams), glycerol (264 grams) and a 5 percent solution of calcium naphthenate (3.4 grams) are heated in a flask fitted with a condenser and an inlet tube through which a moderate stream of carbon dioxide is passed over the surface of the reaction mixture, for one hour at a temperature of 230 degrees C. The solution is then cooled and phthalic anhydride (1100 grams), glycerol (420 grams), and maleic anhydride (28 grams) are added. The resulting mixture is heated for six hours at a temperature of 220 degrees C. and then is cooled. Xylene is added to 630 grams of the resulting resin to dilute the resin to a 60 percent solids concentration. The acid number of the resulting solution is 3, the color 2 (Gardner-Holdt) and the viscosity $Z_4$ (Gardner-Holdt). The mixture of the butyl acetate solution of the hydrolysis products and the 630 grams of alkyd resin (diluted with xylene) is placed in a flask equipped with a Dean-Stark trap, and butyl acetate is distilled while the solution is maintained in gentle reflux for about 2 hours, until a sample of the resin solution forms a clear film on a glass plate upon baking for 5 minutes at 350 degrees C. The results of this test show that the siloxanol is highly reactive in that it reacts completely with the alkyd resin to form a homogeneous, clear product.

Example 2

The procedure of Example 1 is repeated, using 375 grams of phenyltrichlorosilane, 375 grams of ethyltrichlorosilane and 750 cc. of butyl acetate. The ratio of the organosilane solution to the water is 1:26; the water is pumped into the system under a pressure of 15 p. s. i.; the temperature at the inlet of the eductor is 3–10° C.; the temperature at the outlet of the eductor is 4–11° C.; and the temperature of the agitated chamber is below 11° C. The by-product of the hydrolysis reaction is dilute hydrochloric acid (50 pounds having an HCl concentration of 1.8 percent—.285 N). The siloxanol solution prepared by this procedure is tested in the same manner as the siloxanol solution of Example 1, using 1300 grams of the alkyd resin instead of 630 grams, and is found to be similarly highly reactive with the alkyd resin so as to produce a clear film.

Example 3

The procedure of Example 1 is repeated, using phenyltrichlorosilane (500 grams) mixed with a solvent (500 cc. of xylene). The ratio of the organosilane solution to the water is 1:20; the water enters the system under 15–20 p. s. i. pressure; the outlet temperature of the eductor is below 10° C.; and the temperature of the agitated chamber is below 10° C. The by-product of the reaction is dilute hydrochloric acid (24 pounds of .662 N acid). The siloxanol solution prepared by this procedure is tested in the same manner as the siloxanol solution of Example 1, and is found to be similarly highly reactive with the alkyd resin so as to produce a clear film.

Example 4

The procedure of Example 1 is repeated, using ethyltrichlorosilane (500 grams) mixed with a solvent (500 cc. of butyl acetate). The ratio of the organosilane solution to the water is 1:30; the water enters the system under 20 p. s. i. pressure; the outlet temperature of the eductor is below 10° C.; and the temperature of the agitated chamber is 10° C. The by-product of the reaction is dilute hydrochloric acid, having an HCl concentration of 2.4 percent. The siloxanol solution prepared by this procedure is tested in the same manner as the siloxanol solution of Example 1, and is found to be similarly highly reactive with the alkyd resin so as to produce a clear film.

Example 5

The procedure of Example 1 is repeated, except that a column (2½ feet high by ¾ inch in diameter, packed with ³⁄₁₆ inch glass helices) having a contact time of 14 seconds is substituted in place of the agitated chamber. The ratio of the organosilane solution to the water is 1:24; the water enters the system under 15 p. s. i. pressure; and the temperature remains below 20° C. at all points in the system. The by-product of the reaction is dilute hydrochloric acid, having an HCl concentration of 2.3 percent. The siloxanol solution prepared by this procedure is tested in the same manner as the siloxanol solution of Example 1, and is found to be reactive with the alkyd resin so as to produce a film having only a slight haze. A clear film without haze is obtained if, in place of the 2½ foot column, a longer column is employed like the mixing column of the apparatus of Figure 2.

Example 6

Phenyltrichlorosilane (582.5 lbs.) is mixed in a surge tank (using apparatus of Figure II) with an organic solvent (646.75 lbs. of xylene). The resulting solution is continuously drawn, as a stream, into the mixing column by the action of an aqueous stream passing through the eductor, at a solution feed rate of 20 to 40 pounds per hour for twelve hours, and at a rate of 80 to 95 pounds per hour for the next 6 hours. The aqueous stream is initially water, which enters the system at a rate of 1050 to 1400 pounds per hour and is chilled by flowing through the heat exchanger before passing through the eductor. The contact of the silane-solvent solution with the chilled aqueous stream produces an immediate hydrolysis reaction, which goes to completion in the mixing column. The temperature at the eductor outlet is maintained between 11.5° C. and 20° C. by regulating the solution feed rate in accordance with the temperature of the aqueous stream. The by-product of the hydrolysis reaction (dilute hydrochloric acid) is recycled, so that the aqueous stream becomes dilute hydrochloric acid after the completion of the first cycle. The hydrochloric acid becomes more concentrated as the process continues. After this first cycle, the flow of water entering the system is cut back to allow for the amount of recycled water reentering the system, so as to maintain the flow rate of the aqueous stream between 1050 and 1400 pounds per hour. The total product (withdrawn from the top of the second separating column during the 18 hour run) is a solution (1038 pounds) having a solids content of 32.3 percent (on a completely condensed basis) and an acid number (on a completely condensed solids basis) between 38 and 40. The by-product of the hydrolysis reaction (withdrawn from the bottom of the separating columns) is hydrochloric acid having 18.3 percent HCl concentration.

At intervals during the run, seven samples of the product solution and at the same times seven samples of the by-product are removed from the first separating column. A determination is made of the solids content (on a completely condensed basis) and of the molecular weight of the product samples and of the concentration of HCl in the by-product samples.

The results of these determinations are shown in Table 1:

TABLE 1

| By-product Sample No. | Percent HCl | Product Sample No. | Percent Solids of Solution | Molecular Weight of Solute |
|---|---|---|---|---|
| 1 | 3 | 1 | 5.7 | 1,200 |
| 2 | 5.5 | 2 | 27.5 | 1,223 |
| 3 | 6.0 | 3 | 28.7 | 1,174 |
| 4 | 9.0 | 4 | 36.1 | 1,287 |
| 5 | 12.5 | 5 | 38.6 | 974 |
| 6 | 16.5 | 6 | 39.3 | 1,786 |
| 7 | 18.2 | 7 | 39.6 | 1,690 |

A large sample (500 pounds) of the product solution is tested in the same manner as the siloxanol solution of Example 1, using 162 pounds of the same alkyd resin instead of 630 grams, and is found to be similarly highly reactive with the alkyd resin so as to produce a clear film.

Example 7

The procedure of Example 6 is repeated using phenyltrichlorosilane (477 pounds) and a mixed solvent (453 pounds, consisting of 40 percent butyl acetate and 60 percent xylene) at a feed rate of 60 to 85 pounds of organosilane solution per hour for a total run of 6¾ hours. The aqueous stream is hydrochloric acid (initially 7.1 percent HCl and finally 20.7 percent HCl) flowing at a rate of 850–1050 pounds per hour. The temperature at the eductor outlet is maintained between 9 and 16° C. The product of the reaction is 730.5 pounds of a solution having a solids content of 39.0 percent whose acid number is 38.8.

A large sample (263 pounds) of the product solution is tested in the same manner as the siloxanol solution of Example 1, using 103 pounds of the same alkyd resin instead of 630 grams, and is found to be similarly highly reactive with the alkyd resin so as to produce a clear film.

Example 8

The procedure of Example 6 is repeated using ethyltrichlorosilane (250.5 pounds), phenyltrichlorosilane (250.5 pounds) and a mixed solvent (433¼ pounds consisting, of 40 percent butyl acetate and 60 percent xylene) at a feed rate of 50 to 75 pounds of organosilane solution per hour for a total run of 7¾ hours. The aqueous stream is hydrochloric acid (initially 3.6 percent HCl and finally 19.8 percent HCl) flowing at a rate of 2400–2500 pounds per hour. The temperature at the eductor outlet is maintained between 16 and 20° C. The product of the reaction is 658.1 pounds of a solution having a solids content of 37.3 percent.

A large sample (636 pounds) of the product solution is tested in the same manner as the siloxanol solution of Example 1, except that the alkyd resin solution is prepared as follows: Alkali refined soya oil (1130 pounds), technical pentaerythritol (225 pounds) and a 5 percent solution of calcium naphthenate (4.5 pounds) are heated using the apparatus described in Example 1 for one hour at a temperature of 235° C. The solution is then cooled and phthalic anhydride (434 pounds) and maleic anhydride (9 pounds) are added. The resulting mixture is heated for six hours at a temperature of 235° C. and then is cooled. "Varnolene" (mineral spirits) is added to 237 pounds of the resulting resin to dilute the resin to a 70 percent solids concentration. The acid number of the resulting solution is 4, the color 5 (Gardner-Holdt) and the viscosity $Z_1$ (Gardner-Holdt). This product is found to be similarly highly reactive with the alkyd resin.

Example 9

The procedure of Example 6 is repeated using phenyltrichlorosilane (569 pounds) and a mixed solvent (536.5 pounds, consisting of 40 percent butyl acetate and 60 percent xylene) at a feed rate of 68–75 pounds of organosilane solution per hour for a total run of 7¾ hours. The aqueous stream is hydrochloric acid (initially 4.37 percent HCl and finally 21.4 percent HCl) flowing at a rate of 1900 to 2150 pounds per hour. The temperature at the eductor outlet is maintained between 15 and 16° C. The product of the reaction is 837.5 pounds of a solution having a solids content of 39.35 percent whose whose acid number is 38.5.

A large sample (672 pounds) of the product solution is tested by mixing it with a resin solution prepared as follows: Polymerized rosin (268 pounds), pentaerythritol (31 pounds) and calcium acetate (1.35 pounds) are heated using the apparatus described in Example 1, at a temperature of 275° C. until the acid number is between 10 and 20. Xylene is added to the resulting resin to dilute the resin to a 50 percent solids concentration. The two solutions are found to be completely compatible. This test shows that the product has a very low molecular weight, because it has been found that such a product must have a very low molecular weight in order to pass this test.

Example 10

The procedure of Example 6 is repeated using phenyltrichlorosilane (535 pounds) and a mixed solvent (485 pounds, consisting of 40 percent butyl acetate and 60 percent xylene) at a feed rate between 80 pounds and 102 pounds per hour for a total run of 6 hours. The aqueous stream is hydrochloric acid (initially 5.5 percent HCl and finally 21.9 percent HCl) flowing at a rate of 1700 to 2100 pounds per hour. The temperature at the eductor outlet is maintained between 16 and 20° C. The product of the reaction is 818.4 pounds of a solution having a solids content of 41.06 percent whose acid number is 35.4.

A large sample (480 pounds) of the product solution is tested in the same manner as the siloxanol solution of Example 1, using 197 pounds of the same alkyd resin instead of 630 grams, and is found to be similarly highly reactive with the alkyd resin so as to produce a clear film.

Example 11

The procedure of Example 6 is repeated using phenyltrichlorosilane (547.5 pounds) and a mixed solvent (509.5 pounds, consisting of 40 percent butyl acetate and 60 percent xylene) at a feed rate from 80 pounds per hour to 120 pounds per hour for a total run of 5⅔ hours. The aqueous stream is hydrochloric acid (initially 4.75 percent HCl and finally 21.7 percent HCl) flowing at a rate of 1900 to 2050 pounds per hour. The temperature at the educator outlet is maintained between 15 and 20° C. The product of the reaction is 870 pounds of a solution having a solids content of 38.0 percent whose acid number is 72.

The product is tested in the same manner as the product of Example 9, and like the product of Example 9, is found to be of very low molecular weight.

Example 12

The procedure of Example 6 is repeated, except that the final produce is washed with water after being withdrawn from the first separation column. The aqueous stream is initially water and is finally hydrochloric acid (20 percent HCl). The temperature at the eductor outlet is maintained between 10 and 15° C. The product of the reaction is a solution having a solids content of 22.75 percent whose acid number is 52.6.

At intervals during the run, five samples of the product solution and at the same times five samples of the by-product are removed from the first separating column. A determination is made of the solids content (completely condensed basis), the molecular weight, and the acid number (solids basis) of the product samples, and of the concentration of HCl in the by-product samples. The results of these determinations are shown in Table 2:

TABLE 2

| By-product Sample No. | Percent HCl | Product Sample No. | Percent Solids of Solution | Molecular Weight of Solute | Acid No. of Solute |
|---|---|---|---|---|---|
| 1 | 0–3 | 1 | 24.5 | 1,697 | 42.1 |
| 2 | 4–6 | 2 | 22.3 | 1,513 | 42.4 |
| 3 | 7–12 | 3 | 27 | 1,943 | 53.3 |
| 4 | 14–20 | 4 | 23 | 1,381 | 38.6 |
| 5 | greater than 20 | 5 | 22.7 | 1,923 | 16.6 |

A large sample (1110 pounds) of the product solution is tested in the same manner as the siloxanol solution of Example 1, using 252 pounds of the same alkyd resin instead of 630 grams, and is found to be similarly highly reactive with the alkyd resin so as to produce a clear film.

Having described the invention, I claim:

1. A method of hydrolyzing an organosilane, which comprises merging a continuous aqueous liquid stream with a continuous anhydrous liquid stream comprising the organosilane, to form a liquid reaction stream, continuously conducting the reaction stream away from the point of merger to keep the final products of the reaction out of contact with the initial products of the reaction and out of contact with the reactants, and maintaining the flow of the reaction stream until the reaction is substantially complete, separating the hydrolyzed organosilicon product from the aqueous phase, said aqueous liquid stream comprising sufficient water to constitute at least 5 gram mols thereof for every two gram atoms of hydrolyzable group in the silanes contained in the anhydrous stream.

2. A method as claimed in claim 1 wherein the organosilane is an organotrichlorosilane.

3. A method as claimed in claim 1 wherein the products of the hydrolysis have an average molecular weight below 4,500.

4. A method of hydrolyzing an organochlorosilane, which comprises merging a continuous aqueous liquid stream with a continuous anhydrous liquid stream comprising the organochlorosilane, to form a liquid reaction stream, continuously conducting the reaction stream away from the point of merger to keep the final products of the reaction out of contact with the initial products of the reaction and out of contact with the reactants, maintaining the flow of the reaction stream until the reaction is substantially complete, separating the resulting organosilicon product from the aqueous phase, and recycling a portion of the aqueous phase, together with make-up water, to form the entering aqueous stream, said aqueous liquid stream comprising water in sufficient amount to constitute at least 5 gram mols thereof for every two gram atoms of hydrolyzable group in the silanes contained in the anhydrous stream.

5. A method of hydrolyzing an organochlorosilane, which comprises merging a continuous aqueous liquid stream with a continuous anhydrous liquid stream comprising the organochlorosilane, to form a liquid reaction stream, continuously conducting the reaction stream away from the point of merger to keep the final products of the reaction out of contact with the initial products of the reaction and out of contact with the reactants, maintaining the flow of the reaction stream until the reaction is substantially complete, separating the resulting organosilicon product from the aqueous phase, recycling the aqueous phase, together with make-up water, to such an extent that the system reaches a constant operating condition, and then maintaining constant the proportion of the aqueous phase that is recycled, whereby the remainder of the aqueous phase can be recovered as a hydrochloric acid solution of constant concentration, said aqueous liquid stream comprising water in sufficient amount to constitute at least 5 gram mols thereof for every two gram atoms of hydrolyzable group in the silanes contained in the anhydrous stream.

6. A method as claimed in claim 1 wherein the anhydrous stream comprises an inert solvent having a boiling point below 200° C. which is able to form a solution with the organosilane and the organosilicon hydrolysis products without undergoing any chemical reaction therewith, said inert solvent being substantially immiscible with the aqueous stream.

7. A method as claimed in claim 6 wherein the solvent is an aliphatic monocarboxylic ester derived by the esterification of an aliphatic monohydric alcohol having from 2 to 8 carbon atoms with a saturated aliphatic monocarboxylic acid containing from two to four carbon atoms, the total number of atoms in the ester molecule being at least 5 and not greater than 10.

8. A method as claimed in claim 6 wherein the solvent is an aliphatic ketone whose molecule has at least 5 and not more than 10 carbon atoms.

9. A method as claimed in claim 6 wherein the solvent is a mixture of xylene and butyl acetate in the weight proportion of from 3:7 to 4:1.

10. The process of preparing organopolysiloxanes from organochlorosilanes of the type $R_nSiCl_{4-n}$ where R is a member of the class consisting of alkyl and aryl radicals and $n$ has a value of from 1 to 3, which process comprises continuously introducing water and an organochlorosilane of the above type into a reaction zone to effect hydrolysis of the organochlorosilane and to form a reaction mixture comprising organopolysiloxanes and acid-containing water, there being used a sufficient excess of water so that essentially all silicon bonded chlorine atoms are hydrolyzed, and the resulting hydrochloric acid is relatively concentrated, conducting the resulting reaction mixture comprising organopolysiloxanes and acid-containing water to a liquid-stratification separating zone, separating the organopolysiloxane phase from the acid-containing water phase, recycling the acid-containing water substantially free of any silicon composition and diffusing it into freshly fed water and organochlorosilane introduced into the reaction zone.

11. A method of hydrolyzing an organosilane which comprises merging a continuous aqueous liquid stream with a continuous anhydrous liquid stream comprising the organosilane, to form a liquid reaction stream, continuously conducting the reaction stream away from the point of merger to keep the final products of the reaction out of contact with the initial products of reaction and out of contact with the reactants, separating the hydrolyzed organosilicon product from the aqueous phase and recycling the aqueous phase to form the entering aqueous stream, said aqueous liquid stream being maintained at a temperature not greater than 20° C. at a point just prior to said point of merger and comprising sufficient water to constitute at least 5 gram mols thereof for every two gram atoms of hydrolyzable group in the silanes contained in the anhydrous stream.

References Cited in the file of this patent

UNITED STATES PATENTS

| | | |
|---|---|---|
| 2,332,527 | Pyzel | Oct. 26, 1943 |
| 2,483,963 | Barry et al. | Oct. 4, 1949 |
| 2,501,525 | Krieble et al. | Mar. 21, 1950 |
| 2,641,589 | Chevalier | June 9, 1953 |
| 2,719,859 | Nitzsche et al. | Oct. 4, 1955 |